(12) United States Patent
Beck

(10) Patent No.: US 10,246,212 B2
(45) Date of Patent: Apr. 2, 2019

(54) CONTAINER STORAGE SYSTEM AND SUPPORT AND CROSS BAR OF SUCH A CONTAINER STORAGE SYSTEM

(71) Applicant: KOBECK GbR, Pleiskirchen (DE)

(72) Inventor: Michael Beck, Toging am Inn (DE)

(73) Assignee: Kobeck GBR, Pleiskirchen (DE)

( * ) Notice: Subject to any disclaimer, the term of this patent is extended or adjusted under 35 U.S.C. 154(b) by 400 days.

(21) Appl. No.: 14/776,923

(22) PCT Filed: Apr. 1, 2014

(86) PCT No.: PCT/EP2014/000870
§ 371 (c)(1),
(2) Date: Sep. 15, 2015

(87) PCT Pub. No.: WO2014/161655
PCT Pub. Date: Oct. 9, 2014

(65) Prior Publication Data
US 2016/0039558 A1    Feb. 11, 2016

(30) Foreign Application Priority Data

Apr. 2, 2013   (DE) .......................... 10 2013 005 636

(51) Int. Cl.
*B65D 1/42*   (2006.01)
*B65D 90/00*  (2006.01)

(52) U.S. Cl.
CPC ........... *B65D 1/42* (2013.01); *B65D 90/0053* (2013.01)

(58) Field of Classification Search
CPC .............................. B65D 1/42; B65D 90/0053
See application file for complete search history.

(56) References Cited

U.S. PATENT DOCUMENTS 3,897,971 A * 8/1975 Evans .................... B60P 7/14
                                                  105/372
4,501,402 A * 2/1985 Saito .................. B65D 19/0095
                                                  108/55.3
(Continued)

FOREIGN PATENT DOCUMENTS

AU    2010200683       2/2011
CN    2 423 249 Y      3/2001
(Continued)

OTHER PUBLICATIONS

International Search Report and Written Opinion dated Jul. 11, 2014 for Application No. PCT/EP2014/000870.

*Primary Examiner* — Anthony D Stashick
*Assistant Examiner* — James R Way
(74) *Attorney, Agent, or Firm* — Frost Brown Todd, LLC

(57) ABSTRACT

The invention relates to a container storage system (1) for transporting and/or for securing cargo in a container (3), and/or for partitioning the container (3), wherein the container (3) comprises side walls made of trapezoidal sheets having vertical creases (4), characterized in that the container storage system (1) comprises: At least two lateral supports (5a, b), which can be arranged vertically in at least two opposite creases (4) of at least two opposite side walls of the container (3). The supports (5a, b) each have at least one recess (13) that can be oriented to the inner chamber of the container (3) for receiving a cross bar (7). In the recess (13), at least one bearing element (11) for supporting the cross bar (7) is provided. At least one cross bar (7) is provided, which can be inserted in the at least two recesses (13) in the at least two supports (5a, b), respectively, and when installed, connects the two supports (5a, b) with one another, wherein the container storage system (1) can be assembled and dismantled without tools.

18 Claims, 10 Drawing Sheets

(56) References Cited

U.S. PATENT DOCUMENTS

| | | | | |
|---|---|---|---|---|
| 5,042,863 A | * | 8/1991 | Fraga | B60P 1/00 |
| | | | | 108/67 |
| 5,314,276 A | | 5/1994 | Barone | |
| 5,375,534 A | * | 12/1994 | Adams | B60P 7/135 |
| | | | | 105/372 |
| 6,585,306 B1 | * | 7/2003 | Smith | B60P 1/00 |
| | | | | 296/24.44 |
| 6,893,075 B2 | | 5/2005 | Fenton et al. | |
| 7,188,817 B2 | * | 3/2007 | Henning | B60P 7/08 |
| | | | | 108/57.29 |
| 7,293,813 B2 | * | 11/2007 | Squyres | B60P 1/00 |
| | | | | 105/372 |
| 7,357,611 B2 | * | 4/2008 | Faivre | B60P 7/14 |
| | | | | 410/129 |
| 2009/0090827 A1 | * | 4/2009 | Kanczuzewski | B65D 90/0053 |
| | | | | 248/205.3 |
| 2010/0122981 A1 | | 5/2010 | Sims | |
| 2010/0147728 A1 | | 6/2010 | Guiles et al. | |
| 2015/0061259 A1 | * | 3/2015 | Fox | B60P 3/122 |
| | | | | 280/415.1 |

FOREIGN PATENT DOCUMENTS

| | | |
|---|---|---|
| CN | 2 701 796 Y | 5/2005 |
| CN | 202 439 998 U | 9/2012 |
| DE | 29708856 U1 | 9/1998 |
| DE | 102013005636 B3 | 7/2014 |
| FR | 2967982 A1 | 6/2012 |
| JP | S50-14466 A | 2/1975 |
| JP | 2003-200861 A | 7/2003 |
| JP | 2009-126442 A | 6/2009 |

* cited by examiner

CONTAINER STORAGE SYSTEM AND SUPPORT AND CROSS BAR OF SUCH A CONTAINER STORAGE SYSTEM

The invention concerns a container storage system for the transport and/or securing of goods delivered in a container and/or for the subdividing of the container, wherein the container has side walls of trapezoidal sheet with vertical creases.

The invention also concerns a support as well as a cross bar of such a container system.

In these documents the positional designations such as "top", "top bottom", "front", "rear", etc. always pertain to a viewer who is standing in front of a container and looking into the container.

Trapezoidal sheet in the sense of the present invention encompasses profiled sheets which are generally trapezoidally edged in cross section. Such trapezoidal sheets find application primarily in industrial construction, but principally for the configuring of wall and side structures of containers. The raised portions of the trapezoidal sheets are usually called webs and the depressions in between are called creases.

Container in the sense of the invention encompasses in general large-room containers for the storage and transport of goods being delivered. For example, it may involve ISO containers, which are used in particular as 40 foot containers with dimensions of 12.192×2.438×2.591 m for example as sea freight containers per the ISO standard 668. Container also encompasses so-called truck swap bodies but also other cargo spaces which comprise corresponding trapezoidal sheet side walls. Such containers can be delivered and handled accordingly on ships, railroad, or trucks.

PRIOR ART

Devices and systems for the transport and/or securing of goods being delivered in a container and/or for subdividing a container are known in various configurations and they each have the purpose of securing and/or storing goods being delivered during transport in a container.

Moreover, various devices and materials are known from the prior art which serve for the protection and the transport of cargo. These materials are also called separating or garnishing materials, or garnishing in short. Garnishing materials encompass all materials not firmly connected to a transport unit, the cargo, or its packaging, serving to protect the cargo. This includes dunnage, beams, arches, boards, wedges, plywood and hardboard, tarpaulins, plastics and metal foil, cardboard and paperboard, etc.

Whether such materials are to be classified as garnishing or separating or cargo securing materials depends not on the material but the use thereof Separating means here the conspicuous separating of transport goods or individual parcels within a container. In particular, when identical parcels are destined for different recipients inside a container, separating is important so that the transport goods are not mixed up and/or to avoid sorting work later on. Materials similar to garnishing materials are used as separating materials. The garnishing and separating materials are also fastened by suitable fasteners such as screws, bolts or the like in or on the container as well as in or on the cargo or transport goods.

Moreover, the transport of goods being delivered in a container requires that stowage gaps between container inner wall and transport goods, and between transport goods, be closed up, since especially in the case of transport by sea the container are subjected to the most diverse rocking motions and environmental factors, so that this can lead to cargo shifting and thus damage to the transport goods if the transport goods are not secured.

It is also known, for example, how to splay or wedge pieces of wood of various dimensions, such as squared timbers or the like, inside a container. While such timbers can secure the goods for transport, the splaying can also cause damage to the container. Splayed or wedged timbers can also break or slip during transport, for example, if forces are acting on the container from the outside, such as the impacts when being set down on a ship or a truck, or upon colliding with another container or other cargo units. Damage to securing timbers can also occur for example when a container being lifted is temporarily twisted and/or bent as a result of unequal weight distribution inside the container.

Thus, the known solutions often involve a large time expense when the corresponding securing materials are being installed. The known solutions are also costly in structure and comprise many structural parts, which are particularly prone to wear and tear. In addition, known devices and materials are not necessarily reusable.

FR 2 967 982 A1 discloses a container storage system for the transport of goods in a container and/or for the subdividing of the container, wherein the container has side walls made from trapezoidal sheet with vertical creases.

US 2010/0 147 728 A1 D2 discloses an energy absorbing device for sea containers, or more precisely, a cargo securing device, which can possibly be adapted in part to the goods being transported. The cargo-securing cross bars for this purpose are installed vertically in side guide rails in order to prevent a shifting of the cargo being transported.

PROBLEM AND SOLUTION OF THE INVENTION

Given this context, it is the problem of the present invention to provide an improved container storage system as well as a support and a cross bar for such a container storage system in order to overcome the above disadvantages, or at least reduce them.

This problem is solved each time by the subject matter of the independent claims 1 and 15 and 16.

The container storage system of this kind therefore has, according to claim 1, the following additional features: at least two side supports, which can be arranged vertically in at least two opposite creases of at least two opposite side walls of the container, wherein the supports each have at least one recess which can be oriented toward the inside of the container to accommodate a cross bar and at least one bearing element is provided in the recess to brace the cross bar, at least one cross bar, which can be installed in the at least two recesses in the at least two supports and which joins together the two supports in the mounted state, wherein the container storage system can be assembled and disassembled without the use of tools, the at least two supports can be installed in a crease optionally by the front side or the rear side and/or vertically rotated, wherein the recesses, bearing elements and/or securing elements are configured or arranged such that the front side and the rear side have a different number and/or height of the recesses each with at least one bearing element.

The subject matter of claims 28 and 29 is characterized in that they each concern a support and a cross bar of such a container storage system.

The container storage system according to the invention is functionally secure and can be assembled and disassembled with little expense and without the use of tools. Thus, cargo can be secured in a container and/or the container can also be subdivided with simple means. The container storage system according to the invention is designed to create partitions of any given kind inside a container in horizontal as well as vertical or also in both directions at the same time. Advantageously, the system can thus be adapted flexibly to customer or product specific requirements and in particular it is reusable.

The individual system components can be purchased at low cost, and further cost benefits arise from their reusability and functionality. In particular, thanks to the assembly and disassembly without the use of tools, a fast and time-saving loading of cargo in containers is made possible. Thanks to the reusability of the individual system components and of the overall system, a high sustainability factor can also be achieved, especially thanks to the materials used.

For the assembly, the side supports can simply be arranged or inserted into the opposite creases of a container wall. The recesses arranged or formed in the supports serve to accommodate at least one cross bar, which joins the two supports together. The system is designed such that the system components secure themselves and fit in the container free of stress.

The upright supports according to the invention comprise at least one or more recesses, whose bottom end is bounded by an abutment. The particular recesses with their abutments can be varied in height as desired, so that a container storage system adapted to particular customer or product requirements is achieved with simple means. In the assembled state, the cross bars/braces the lie horizontally on the abutments of the side supports and are situated inside the recesses. The abutments can be designed as a single piece with the respective support, for example, being milled or otherwise suitably machined Alternatively, the abutments can be installed in the respective support. For this, they are preferably designed as plates.

The individual components can be made from suitable materials, such as wood or wood composite, for example supports of OSB (Oriented Strand Board). The cross bars or braces can be made from massive wood, such as squared timber. It is also possible to make the supports and cross bars or braces from metal, plastic, or other composites, such as WPC (Wood Polymer Composite), which are suitable to withstanding the requirements, influences, and stresses within a container, giving the preference to sustainable materials. Likewise, the supports can be made chips pressed in a mold. Advantageously, the material thicknesses and cross sections can be adapted to the particular stress requirements.

On the whole, the container storage system according to the invention is less prone to malfunction and wear and tear than the prior art and thus increases the lifetime of the stressed components, as well as the overall system. The container storage system according to the invention also advantageously forms no firm connection to the container. It is basically suited to a reusability of all container/cargo spaces having trapezoidal sheet side walls. The assembly and disassembly without the use of tools in particular allows a noiseless assembly process, which in turn improves the ergonomics at the work site. In addition, the risk of injury is minimized, so no sawing, drilling or nailing has to be done. Also the risk of damaging of the container is also reduced thanks to an advantageous pressure distribution, namely, especially a point load against the particular side walls. In this way, a costly wedging of squared timbers as in the prior art can be avoided, so that the lifetime of the individual components is increased.

Preferably in the container storage system the length of the supports corresponds partly or entirely to the height of a container side wall.

The container side walls are fitted into a container frame so that the length of the supports basically corresponds to the length of the container side wall.

Advantageously, the at least one support can thus be installed free of stress in the container. For this, it is simply inserted into the selected crease.

Preferably in the container storage system the dimensions of the supports and cross bars are chosen to be less than the interior dimensions of the container, so that the container storage system can be mounted free of stress in the container.

With this feature, the container storage system as well as the individual components have a certain elasticity and play so as to even out or absorb any deformations already present in the container, such as dents or dings in the container interior.

Preferably in the container storage system the outer contours of the supports are at least partly complementary to the creases of the container.

The outer contour of the particular support can lie with its full surface against the particular creases. Moreover, the outer contour of the supports can be adapted in addition to the inner contour of the webs. In both cases, the webs prevent a sideways tilting of the particular support. Insofar as the supports correspond at least in width to the inner dimensions of the creases, the dimensions of the supports ensure a cross section profile having sufficient stability to absorb corresponding loads from the cargo. Advantageously, neither are there any losses in cargo space due to this configuration of the supports. Thanks to the broader design of the supports, especially in the slopes of the webs, it is also possible to achieve larger cross sections of the cross beams, so that the cross beams can support larger loads.

Preferably in the container storage system at least one recess can be arranged or configured to be variable in height in the at least two supports.

Depending on the customer's requirements or the goods being transported, one or more recesses can be fashioned in the particular supports or be arranged there. This ensures a high flexibility and adaptability of the container storage system to the particular cargo being transported.

Preferably in the container storage system at least one recess is arranged or configured in the support so that the cross bar can be inserted diagonally or slanting from above into the particular recess.

Such a configuration of the recess allows an assembly without the use of tools and an easy shoving or inserting of the particular cross bar into the recess.

Preferably in the container storage system the at least one recess in the particular support is bounded at the bottom by a bearing element to support a cross bar.

If the at least one recess in the support is fashioned as a single piece, for example by milling, the lower boundary of the milled groove also automatically forms the limit of the recess. Alternatively, for example in the case of a multiple-piece support, an additional bearing element can be provided, which is inserted between two side cheeks of a support, thereby bounding the particular recess at the bottom.

Preferably the bearing element for the supporting of a cross bar is dimensioned such that a sufficient load and force distribution is assured. In one simple embodiment, the bearing element can be configured as a plate, for example, and be inserted between two side cheeks and secured there by corresponding connecting means, such as nails or other compressed air projectiles.

Preferably in the container storage system the surface of the bearing element is at least partly antislip treated and/or coated with an antislip material.

As the slip treatment, for example, a roughening of the surface is possible, or an antislip structure can be introduced into the bearing element. Alternatively, for example, an antislip coating can be provided, which is placed for example in the form of a foil or another suitable elastic form on the bearing element.

Preferably in the container storage system the at least one or two supports are fashioned as a single piece.

A single-piece design ensures a sufficient stability of the support and in particular a good force application and force absorption in the support. Suitable materials for the support can be, for example, wood or wood composites or other suitable composites, such as WPC (Wood Polymer Composite). In this case, the recesses are then introduced into the support, for example by milling.

Preferably in the container storage system the at least one support or two supports are fashioned as multiple pieces.

In this case, for example, two side cheeks can be provided, between which the platelike or otherwise suitably configured bearing element is introduced. In the case of multiple bearing elements, the particular recess is automatically formed between two bearing elements. Alternatively, a diaphragm can also be inserted between the side cheeks, so that the recess is also bounded at the top or bottom.

Preferably the two supports of the container storage system comprise at least two side cheeks, between which at least one bearing element can be inserted or installed, while the at least one bearing element establishes a lower end of the at least one recess.

Since such a bearing element can be placed variably between the two side cheeks, the flexibility of the design of the particular supports is thus increased and so also is the flexibility of the container storage system as a whole, so that special customer requirements can be met in particular.

The bearing element serves to support the at least one cross bar and is preferably arranged between the side cheeks so that the bearing element is oriented toward the container interior.

Preferably in the container storage system the at least one or two supports have an essentially U-shaped cross section profile.

The closed side of the U then preferably looks into the container interior, while the open side of the U is designed to bear against the particular crease in the container.

Preferably in the container storage system at least one securing element is provided in each support for the securing of the at least one cross bar.

Such a securing element ensures a sufficient stability of the overall system also in the event that the container is subjected to transport movements and thus forces are also acting through the cargo on the container storage system. This prevents a shifting of the individual elements of the container system and thus assures a sufficient stability.

Preferably in the container storage system the at least one securing element is configured to secure at least one cross bar as a so-called spacing element, which is configured and arranged above a bearing element on the opposite side of the support.

Preferably the spacing element is pointing toward the container wall when the support is installed in the respective crease in the container. The spacer for the securing stabilizes the particular cross brace or the cross bar in the respective recess of the respective support. In addition, the spacer or the spacing element exerts an action which stabilizes the support. In particular, the spacing element can be used as a platelike insert between two side cheeks of a multiple-piece support. Alternatively, the spacing element can be milled out from a single-piece support or be otherwise machined.

In addition, the spacing element serves as a safety catch for the particular cross bar or cross beam. When a cross bar is inserted in the particular support or its recess, the respective cross beam easily or slightly clicks in place. That is, in other words, the particular spacing element is configured such that an inserted cross bar cannot move by itself up and out of the recess. When disassembling the container storage system, in order to move the cross bar past the respective safety catch or the spacing element, the respective cross bar and the respective support are pushed toward each other, so that the cross bar can overcome the resistance of the particular spacing elements. Then the respective cross bar slides across the edge of the rear spacing element and it can be pivoted out toward the top.

Preferably the container storage system comprises an elastic element as at least one securing element for securing the at least one cross bar.

The elastic element can be, for example, a lock-in spring or some other spring element which is arranged in the particular support so that it prevents an unintentional dismantling of the particular cross bar toward the top. For the removal process, the respective lock-in spring is pressed into the side cheek of the respective support, for example, so that the respective cross bar can be pivoted out toward the top. When pivoting the respective cross bar into the respective recess, such spring elements can either be pressed manually or through the weight of the cross bar toward the respective side cheek, so that the respective cross bar slides past with no resistance.

Preferably the container storage system comprises at least two supports, which are configured such that they can be installed in the respective crease optionally by their front side or rear side and/or vertically rotated, while the recesses, bearing elements and/or securing elements are arranged or configured such that the front side and rear side of the respective support have a different number of recesses each with at least one bearing element.

The individual bearing elements and spacers are arranged such that, when the support is rotated both vertically and horizontally, a different number and/or height of the respective abutments is provided. Advantageously, this further enhances the flexibility and utility, especially the adaptability of the container storage system to the cargo.

Preferably the container storage system comprises the at least one recess and the at least one bearing element on each side of the respective support.

The respective recess can be arranged or configured on each side of the support. In order to achieve a sufficient cross sectional surface of the respective support, the overall cross section of the respective support is enlarged, so that it is preferably configured basically square-shaped. Such a support may have a larger overhang into the container interior, which reduces the usable width inside the container. However, such a support increases the flexibility, since the respective recesses and bearing elements can be arranged and configured such that many variants and arrangement possibilities are provided, which can be adapted to the particular cargo.

Preferably in the container storage system the length of the at least one cross bar corresponds partly or almost entirely to the internal cross section dimension of a container.

In this way, a time-consuming clamping of the particular cross bar in the container can be avoided. The play between the cross bar and the container side walls increases the adaptability of the system to the conditions in the container and enables a usage free of stresses.

Preferably in the container storage system the at least one cross bar in the mounted state is placed horizontally on the at least two bearing elements of the side supports and is thus supported by the bearing elements.

This assures a uniform arrangement of the particular cross bars and enables level storage and transport surfaces.

Preferably in the container storage system there is provided on the one cross bar on both sides at least one milled rabbet or other milled groove to bear against the bearing element. The milled groove is dimensioned such that a lateral bearing surface is formed for the defined inserting of the cross bar into the respective recess and on the bearing element. The milled groove or rabbet is preferably provided on the underside of the respective cross bar, which at the same time forms the bearing surface on the respective bearing element. The dimensions of the milled groove make sure that the cross bar can be placed in a defined position inside the respective support and on the bearing element. This also defines the clear spacing between the supports. Moreover, the milled groove is preferably configured so that a step is formed at the underside of the respective cross bar, which likewise bears as a bearing surface against the bearing element in the assembled state.

Preferably in the container storage system the surface of the at least one cross bar is at least partly antislip treated and/or coated with an antislip material.

Preferably in the container storage system the dimensioning and outer contour of the at least one cross bar is adapted to the dimensioning and outer contour of the cargo.

The cross bars can be configured as smooth, rectangular, square timber or similar material, on which plates (wood, cardboard or plastic) can be arranged on the entire or partial surface. Alternatively, the cross braces can also be adapted to the goods being loaded, i.e., for example, they can have a corrugated shape for the storage of round material or another corresponding configuration such as comb bars, antislip materials, etc. The antislip treatment can be, for example, a roughening or suitable profiling of the particular surface of the cross bar. The surface of the cross bar is at least partly machined or adapted, and it can also alternatively be provided with an antislip coating, such as a plastic material or similarly suited material.

Preferably the container storage system comprises at least four side supports each with at least one recess, at least two cross bars, while the at least two cross bars which are inserted in the at least one recess in the at least four supports can be arranged parallel to each other and form in the assembled state in the container at least one additional level for storage of cargo.

With this configuration, depending on the number of the particular recesses provided in the height of the particular supports and the cross bars used, further desirable stowage and transport levels can be created in the particular container. This further increases the flexibility of the container storage system and secures the transport and storage of the goods being transported.

Preferably the container storage system further comprises a storage element which can be arranged on both of the at least two cross bars and thus forms an additional storage surface, the storage element being adaptable to the contours and dimensions of the cargo.

The storage elements when in place offer in particular mounting levels in a platelike configuration, but can also be adapted to the cargo. Preferably in the container storage system the storage element can be arranged partly or entirely on both of the at least two cross bars.

This feature also enhances the flexibility of the container storage system, since for example different cargo items have different dimensions, so that a cargo can extend over two or more levels. Thus, these surfaces can be cut out with simple means and still afford a sufficient securing and storage of the respective cargo items.

Preferably in the container storage system additional cross bars and/or longitudinal bars can be coupled to the respective supports and/or cross bars in order to close stowage and loading gaps inside the container.

For example, additional recesses can be provided in the respective supports and/or cross bars with corresponding abutments in which the additional supports and/or cross bars can be inserted. Thus, for example, additional squared timbers or other cross bars can be mounted for securing on both sides of the cargo. Advantageously, the individual cross bars can also be coupled and/or secured with the additional longitudinal bars in the lengthwise direction of the container.

Preferably in the container storage system securing means and/or fittings are provided for additional cargo securing.

This feature facilitates for example a coupling of additional cross bars and/or longitudinal bars with the already provided supports and cross bars. In this way it is also possible to couple additional separating and garnishing material with the container storage system and its individual components. Thus, the securing and/or storing of the particular transport goods or cargo can be further improved.

For example, the cross bars can be additionally secured by screwing, with bolts and/or pins or other fastening elements. Insofar as a corresponding container storage system is placed each time in front of and behind the respective cargo, additional longitudinal bars can be screwed or otherwise suitably fastened, such as by a plug-in design, by means of the additional cross bars for example, so that in principle the container storage system can be widened or expanded in all directions as a network of beams in a scaffolding. Alternatively and/or additionally, the cargo can be secured to the respective fittings.

On the whole, the container storage system according to the invention provides a flexible and diversified system for storage, securing and separating of cargo inside a container. Numerous transport levels can also be provided in sea containers or other containers. Thus, for example, in the case of the aforementioned ISO containers with dimension of 40", roughly 40 systems can be installed in the respective creases in the trapezoidal sheet of the side walls. The container storage system of the invention can also be used to close up loading or stowage gaps between individual goods being delivered in a container. Since the arrangement of the recesses and abutments in the particular support and the number thereof can be variously chosen, the container storage system can be adapted to the particular cargo.

DESCRIPTION OF THE FIGURES

Sample embodiments of the invention are explained more closely below with reference to the enclosed schematic drawings. There are shown.

Figure 1:
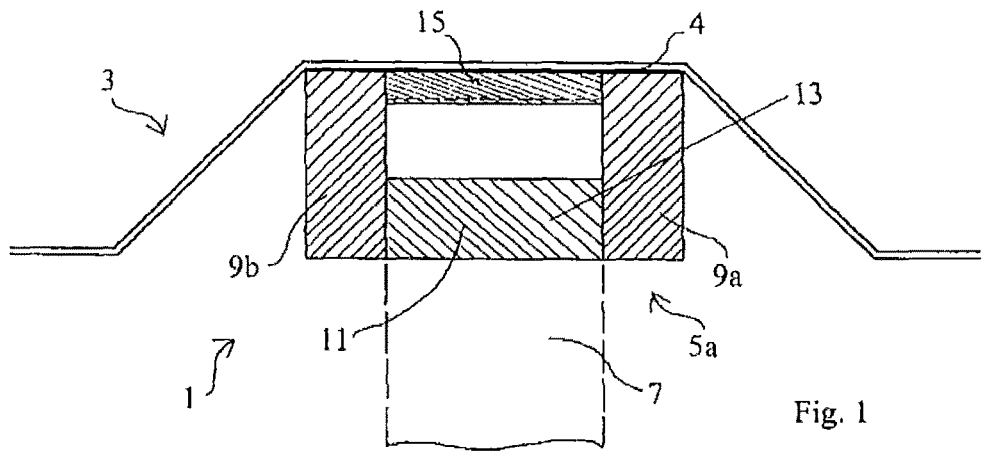
FIG. 1 a top view of a segment of a sample embodiment of a container storage system according to the invention in the assembled state.
Figure 2:
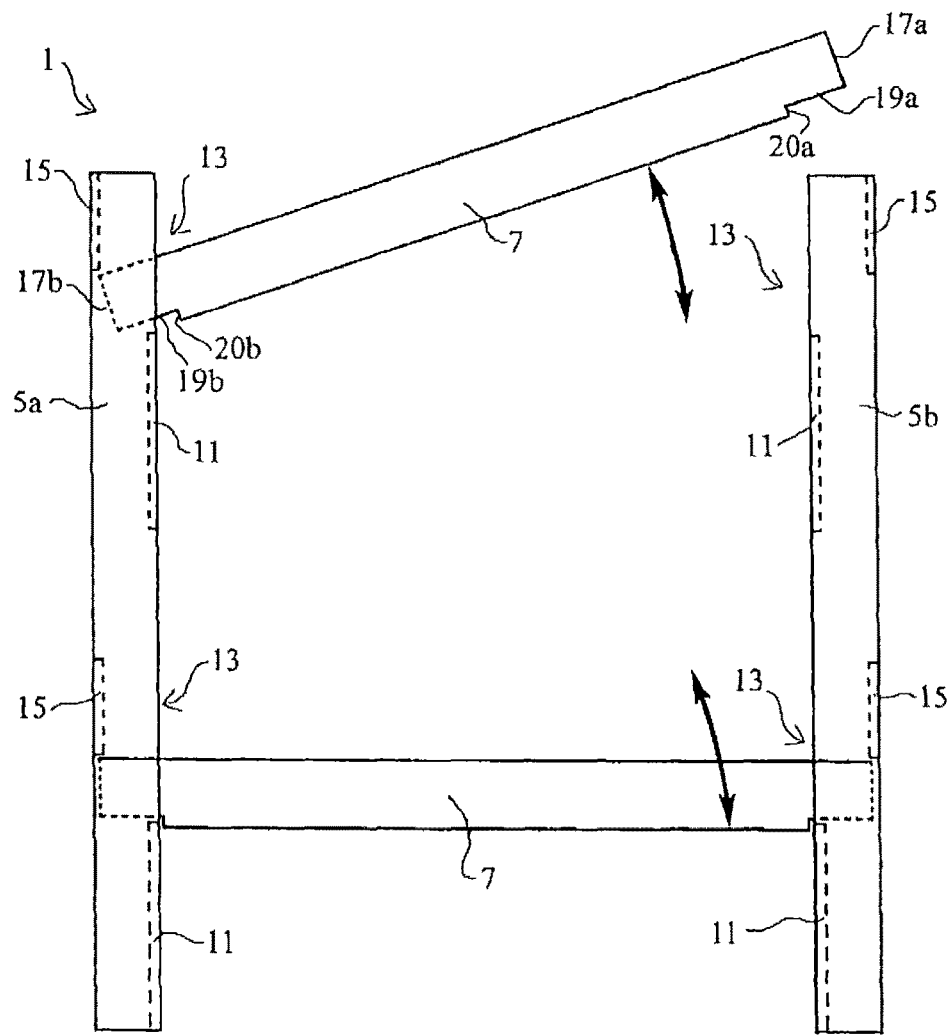
FIG. 2 a schematic front view of the container storage system of FIG. 1.

The construction and assembly of the container storage system according to the invention shall at first be described with the aid of FIGS. 1 and 2. The other figures each show alternative embodiments of the container storage system or its components.

According to FIGS. 1 and 2, the container storage system 1 comprises at least two supports 5a, b and at least one cross bar 7. The supports 5a, b are inserted in a container 3 in its opposite creases 4 formed in a trapezoidal sheet wall. The side webs of the trapezoidal sheets prevent a skewing of the supports 5a, b. The dimension of the particular supports 5a, b are chosen to be complementary to the particular crease 4. This reduces or diminishes loss of cargo space.

The supports 5a, b each comprise two side cheeks 9a, b, between which is arranged at least one bearing element 11, in FIG. 2 two bearing elements. In the multiple-piece configuration of the supports 5a, b shown here, the bearing elements 11 are arranged between the side cheeks 9a, b, for example, being glued or nailed. The bearing elements 11 bound at the bottom a recess 13 which is provided in the supports 5a, b. The recess 13 is designed in order to receive the respective cross bar 7 diagonally from above. In the assembled state or installed state in the container, the respective supports are arranged so that the respective bearing element 11 is pointing toward the container interior. At the upper rear end of the respective recess 13, spacing elements 15 are provided each time between the two side cheeks 9a, b, being likewise suitably connected to the respective side cheeks 9a, b. The spacing elements 15 connect the two side cheeks 9a, b at their rear side, which is opposite the respective container crease 4. Thus, the spacing elements 15 increase the stability of the respective support 5a, b.

The cross bars 7 each comprise two ends 17a, b. At the underside of the ends 17a, b there are milled grooves or rabbets 19a, b. These milled grooves 19a, b are bounded by lateral bearing surfaces 20a, b.

In order to install the cross bar 7 in the respective supports 5a, b, at first a first end 17b is inserted into a first recess 13 of the first support 5a, such that the upper edge of the end 17b is introduced beneath the respective spacing element 15 and the cross bar 7 lies with its milled groove 19a or 19b on the particular bearing element 11.

The bearing elements 11 and the spacing elements 15 in one simple embodiment are plate-shaped. When the particular cross bar 7 is inserted diagonally from above into the opposite recess 13 of the support 5b, the end 17a slides past the spacing element 15. The dimensions are chosen such that the particular cross bar "clicks in", so that the particular spacing element 15 serves as a safety catch of the particular cross bar 7. After this, the second milled groove 19a lies on the opposite bearing element 11, whereupon the cross bar 7 can be displaced such that the lateral bearing surface 20a bears laterally against the bearing element 11. The same holds for the opposite side and the bearing surface 20b provided there, which bears against the opposite bearing element 11. The region between the lateral bearing surfaces 20a, b thus determines the clearance of the cross bar 7.

In FIG. 2 the lower cross bar is in the mounted position. As can be seen, the particular cross bar 7 is at a distance from the respective container side wall, i.e., it can be mounted free of stress. This design of the supports 5a, b and the cross bars 7 means that the particular system components of the container storage system 1 stabilize each other. In particular, the milled grooves 19a, 19b prevent an inward tilting of the supports 5a, b. Furthermore, the respective supports 5a, b are held in the creases 4 in the trapezoidal structure of the container side walls, which prevents a sideways tilting of the supports 5a, b.

In order to disassemble the container storage system, the respective cross bar 7 is pressed outward slightly on one side, so that is can slide past the respective spacer 15 at its opposite end 17a, b. It is then removed upward at a slant.

Figure 3:
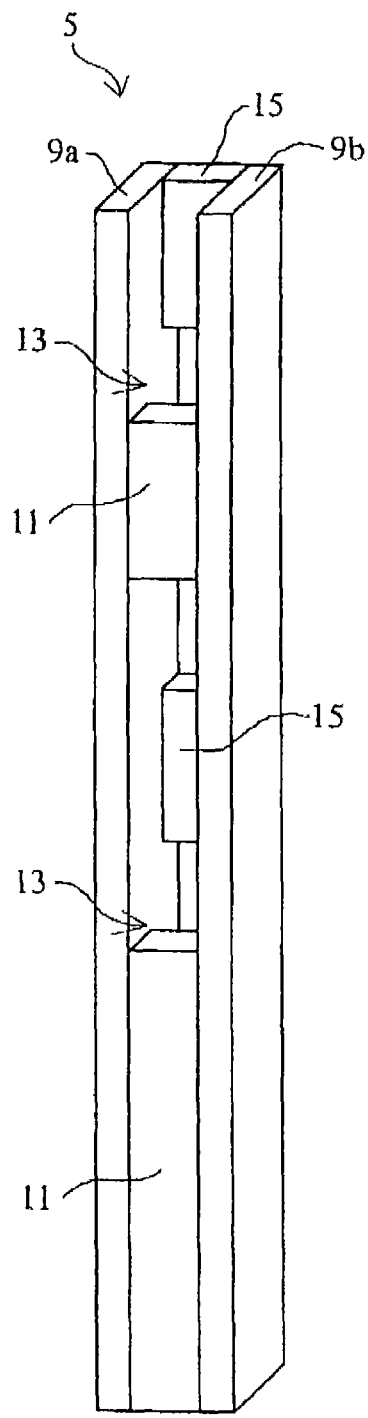
FIG. 3 a perspective representation of a sample embodiment of a support according to the invention in a diagonal view from the right.

FIG. 3 shows the support 5a, b from FIG. 2 in a perspective diagonal view. The recesses 13 can be seen, which are bounded at the bottom by the respective bearing element 11.

Figure 4:
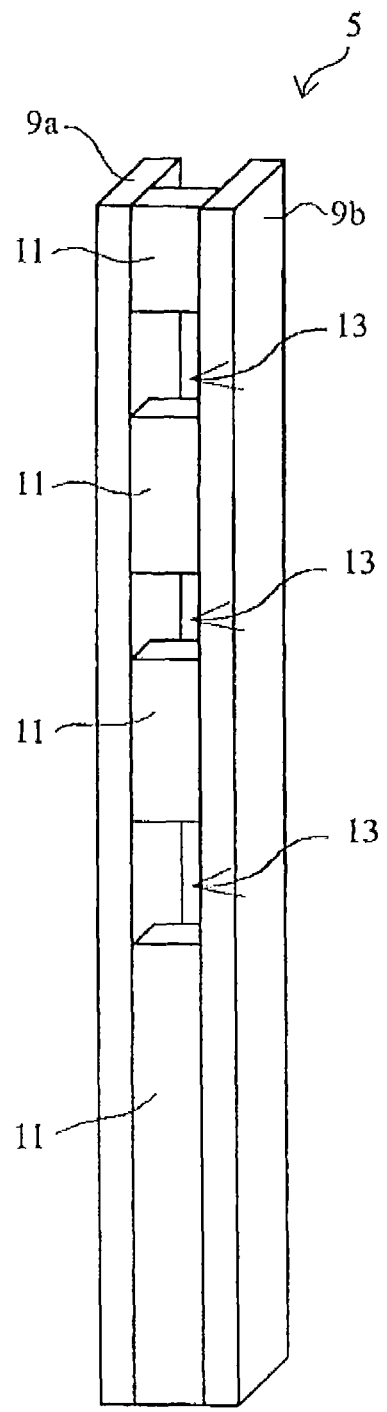
FIG. 4 a perspective representation of an alternative sample embodiment of a support according to the invention in a diagonal view from the right.

FIG. 4 shows another embodiment of a support 5, in which only bearing elements 11 are provided each time between the recesses 13. The support 5 has an essentially U-shaped profile, which simplifies a stacking of the particular supports. In principle, the individual abutments 11 are placed in a row. The recesses 13 between the particular abutments 11 roughly correspond in their dimensions to the cross sectional measurement of the respective cross bar (not shown). The cross bars can be inserted by a parallel displacement of a support 5a, b. That is, the cross bars must be introduced prior to the assembly of the container storage system 1, after which the particular supports 5a, b are inserted into the creases. It is not possible to install the cross bar at a slant from above. However, advantageously there is less volume when the supports are palleted, since the particular U-shaped supports can be nested in one another.

Figure 5:
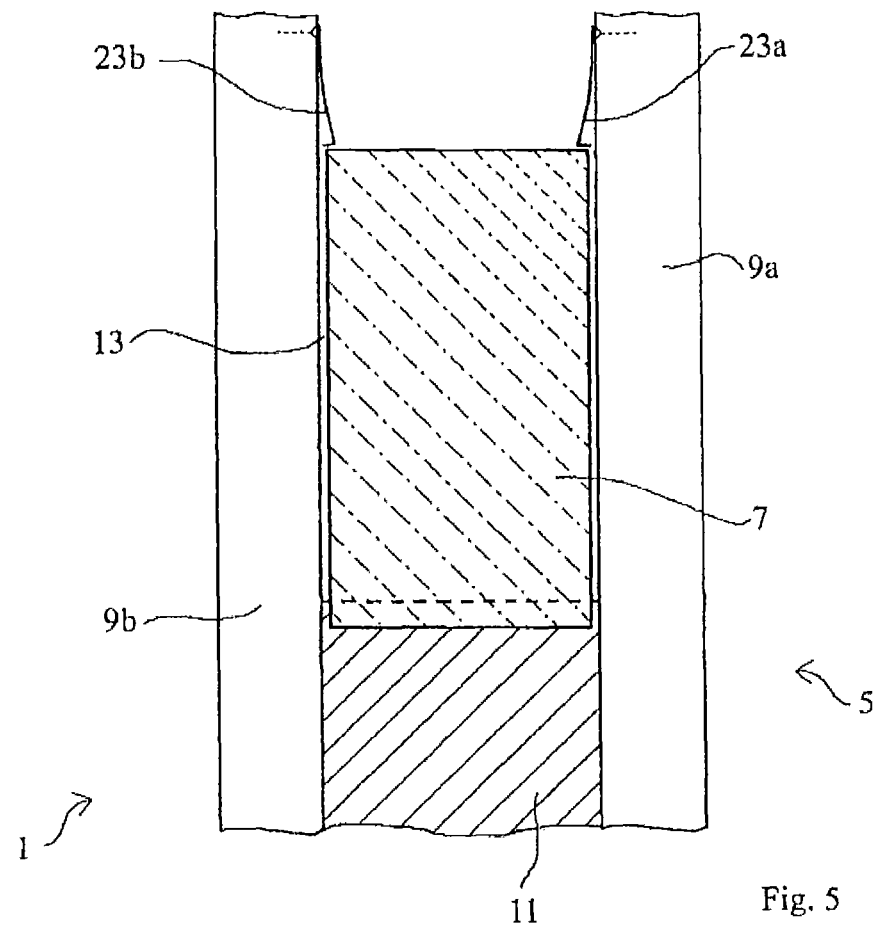
FIG. 5 a side view (longitudinal section) of a partial cutout of an alternative sample embodiment of a container storage system with a securing element.

In the embodiment shown in FIG. 5, a securing spring 23a, b is additionally provided in the side cheeks 9a, b at their inner side, serving as a securing element or safety catch of the cross bar 7. When the cross bar 7 is installed from above, the respective securing spring at the inner side of the respective side cheeks 9a, b is depressed, so that the cross bar 7 can slide past it with its respective end. Once the cross bar 7 is bearing with its lower milled groove against the abutment 11, the respective securing springs 23a, b swivel into the inner space between the side cheeks 9a, b and secure the cross bar 7 from above against dropping out.

Figure 6:
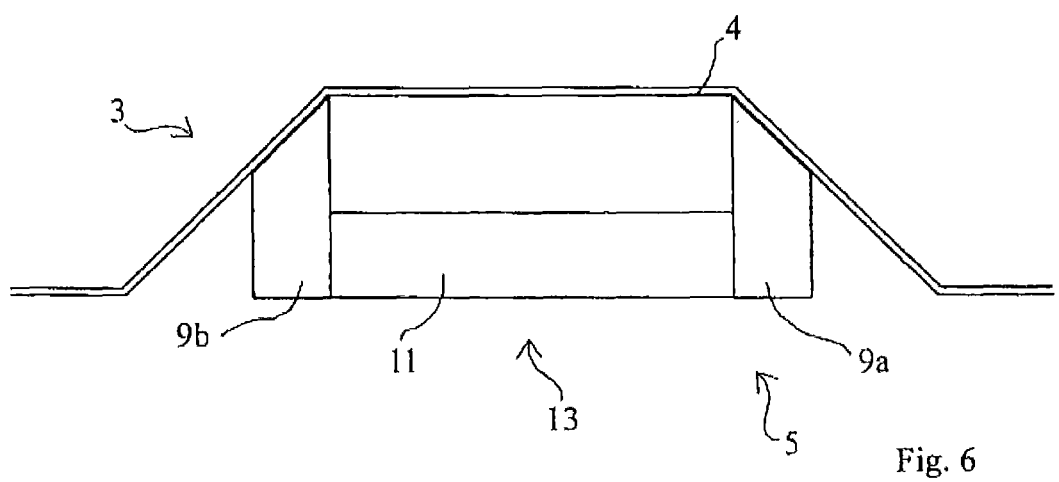
FIG. 6 a top view of another alternative sample embodiment of a support according to the invention in the assembled state.

FIG. 6 shows another embodiment of the support 5 of the container storage system 1 according to the invention. This support 5 has an enlarged cross section, so that it is designed to carry larger loads. The two side cheeks 9a, b here are beveled at their respective ends facing the container side wall or crease 4 and thus are adapted to the trapezoidal shape of the container wall. The length of the bearing element 11 roughly corresponds to the width of the crease 4. It would also be possible for the side cheeks 9a, b to entirely fill up the crease bevels. The width of the recess 13 corresponds to the width of the bearing element 11 and the crease 4.

Figure 7:
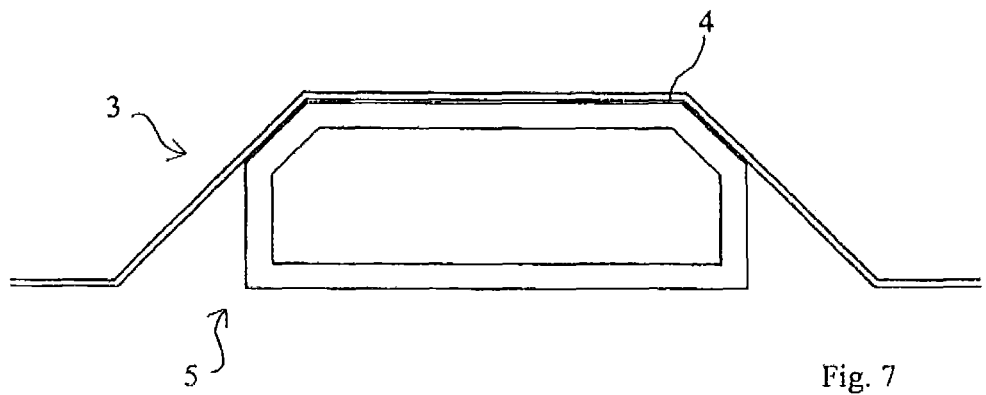
FIG. 7 a top view of another alternative sample embodiment of a support according to the invention.
Figure 8:
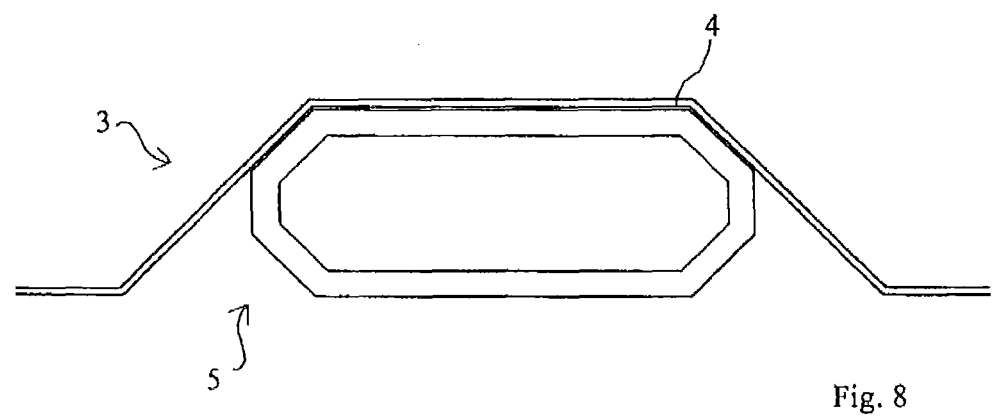
FIG. 8 a top view of another alternative sample embodiment of a support according to the invention.

FIGS. 7 and 8 show two further embodiments of a support 5. The support 5 is a single piece each time, i.e., it can be made from a suitable material such as WPC or another wood composite material. The respective recesses 13 or bearing elements and spacers are then worked into the respective support 5a, b by correspondingly suitable machining, such as milling or the like. The width of the respective support 5a, b can correspond to the crease 4 of the container 3.

In FIG. 7 the support 5 is designed somewhat broader than in FIG. 8 and beveled at its rear end facing the crease 4, so that on the whole a larger cross section of the support 5 results. In the embodiment of FIG. 8, the front corners of the support 5 are likewise beveled. This affords the possibility of twisting the particular support 5a, b as needed, for example, when there is a nonuniform arrangement of recesses, spacers and bearing elements at the front side or rear side of the support 5a, b.

Figures 9A, 9B:
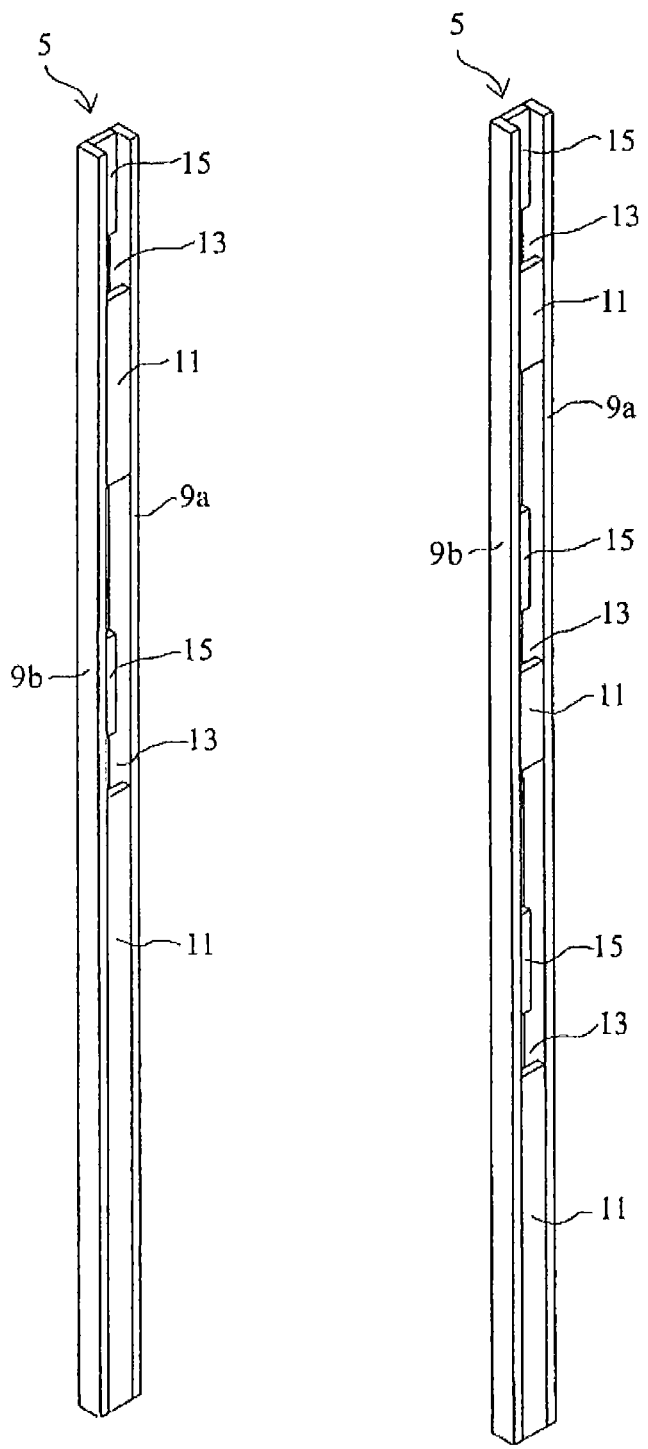
FIG. 9a a perspective representation of an alternative sample embodiment of a support according to the invention for two levels.
FIG. 9b a perspective representation of an alternative sample embodiment of a support according to the invention for three levels.

FIG. 9a to FIG. 11 show different embodiments of supports 5. The embodiment of the support 5 in FIG. 9a shows two recesses 13 to accommodate a single cross bar. Thus, this support 5 is designed to accommodate two cross bars and, when using four such supports, to build up two levels in a container. On the whole, with such a support, the container interior can be partitioned into three levels.

In the embodiment of variant of the support 5 shown in FIG. 9b, a total of three recesses 13 are provided, so that a total of three cross bars can be accommodated here and secured via the spacing pieces 15. When using four such supports, accordingly, three levels in addition to the floor level can be created in a container inner space, so that a total of four fields are created.

Figure 10:
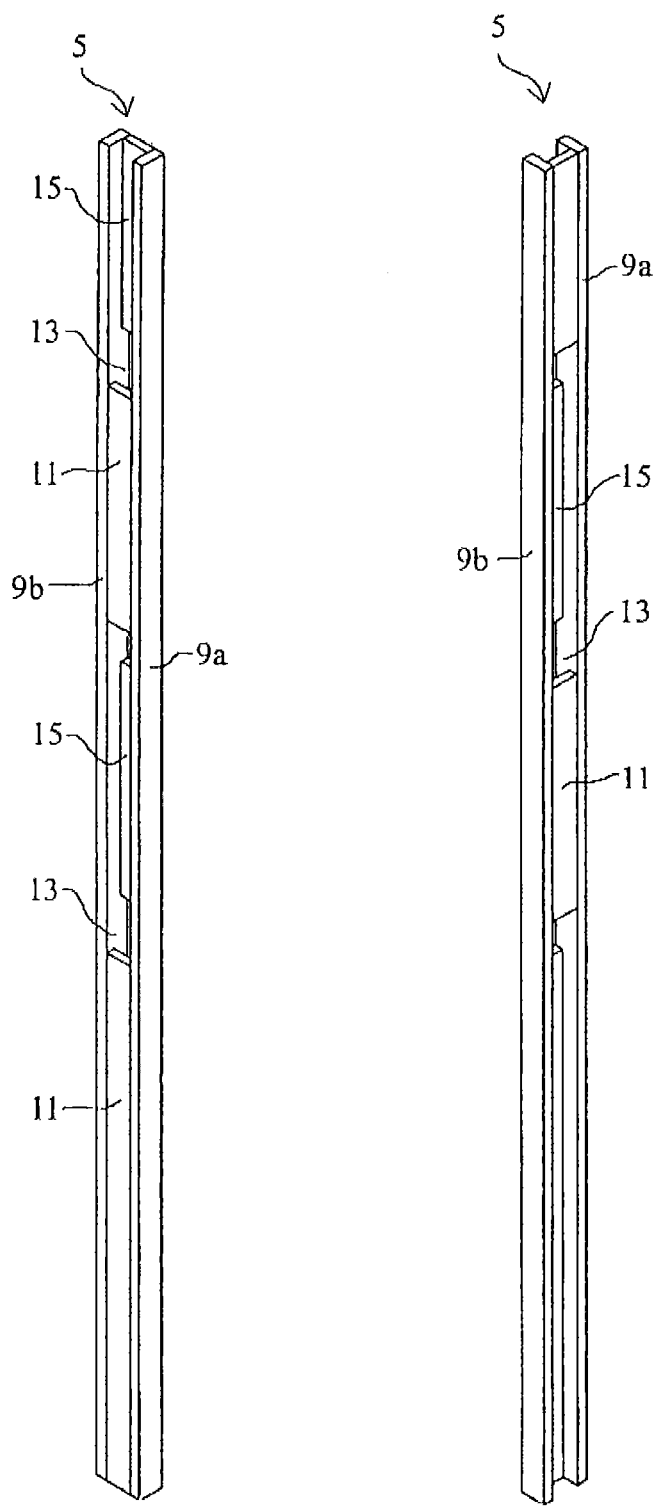
FIG. 10 a perspective side view of an alternative sample embodiment of a vertically pivoting combination support for one or two levels diagonally from the front and from the rear.

FIG. 10 shows a front and rear view of another embodiment of a support 5, which provides one recess 13 at the front side and two recesses 13 at the rear side, so that this support is provided in order to accommodate one or at the rear side two cross bars. Accordingly, depending on the use of the front or rear side of the support 5, one or two additional levels can be created in a container interior.

Figure 11:
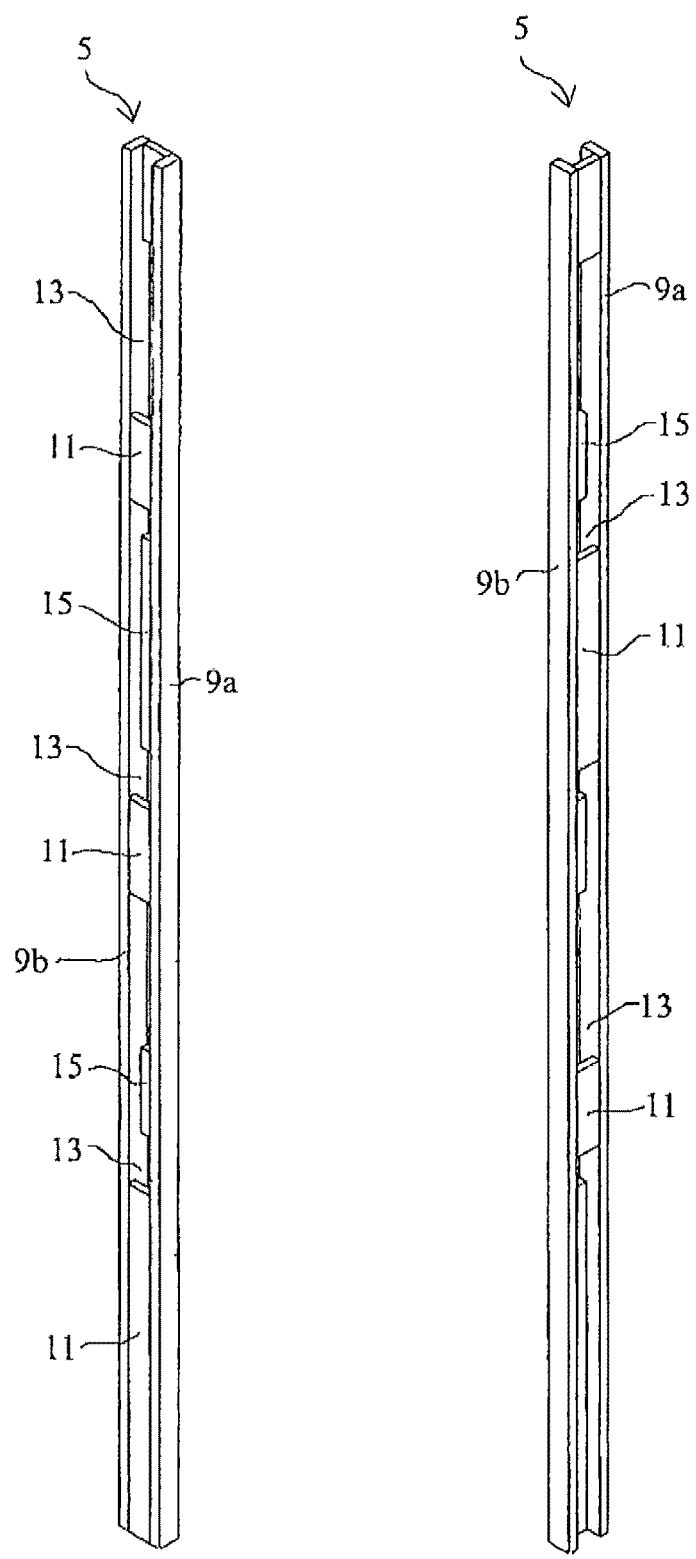
FIG. 11 a perspective side view of an alternative sample embodiment of a vertically pivoting combination support according to the invention for two or three levels diagonally from the front and from the rear.

In the embodiment of FIG. 11, two recesses 13 are provided at the front side of the support 5 and three recesses at the rear side. Thus, by a simple rotation of the particular support both vertically and horizontally, the container can be partitioned in its interior into different numbers of fields or levels. For the securing of the cross bar, either spacing elements 15 are provided as safety catch or, alternatively, when this is not structurally possible, securing springs 23a, b.

Figure 12:
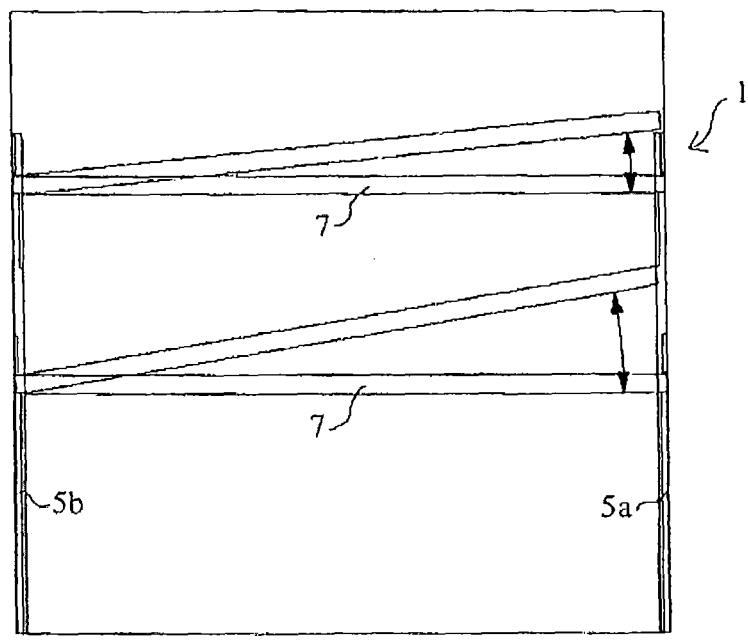
FIG. 12 the sample embodiment of FIG. 9a with two installed cross bars in a side view.
Figure 13:
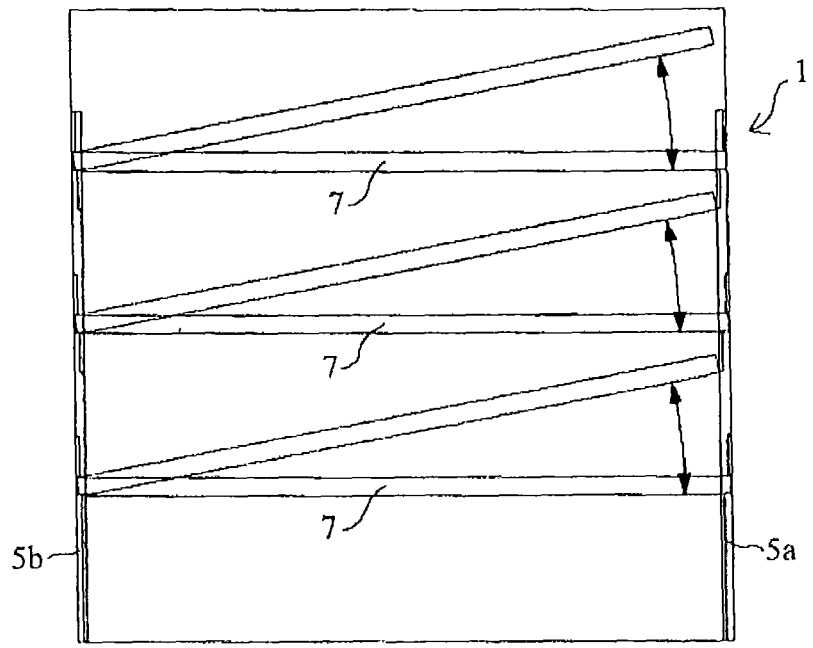
FIG. 13 a side view of the sample embodiment of FIG. 9b with installed or mountable cross bars.

FIG. 12 and FIG. 13 each show a container storage system 1 during assembly and in the assembled state, where the embodiment of the supports 5a, b in FIG. 12 corresponds to the embodiment of the support 5 in FIG. 9a and in FIG. 13 the supports correspond to the embodiment of FIG. 9b. Thus, according to FIG. 12, two levels and a total of three fields are possible in the container interior and according to FIG. 13 three levels or four fields are possible.

Figure 14:
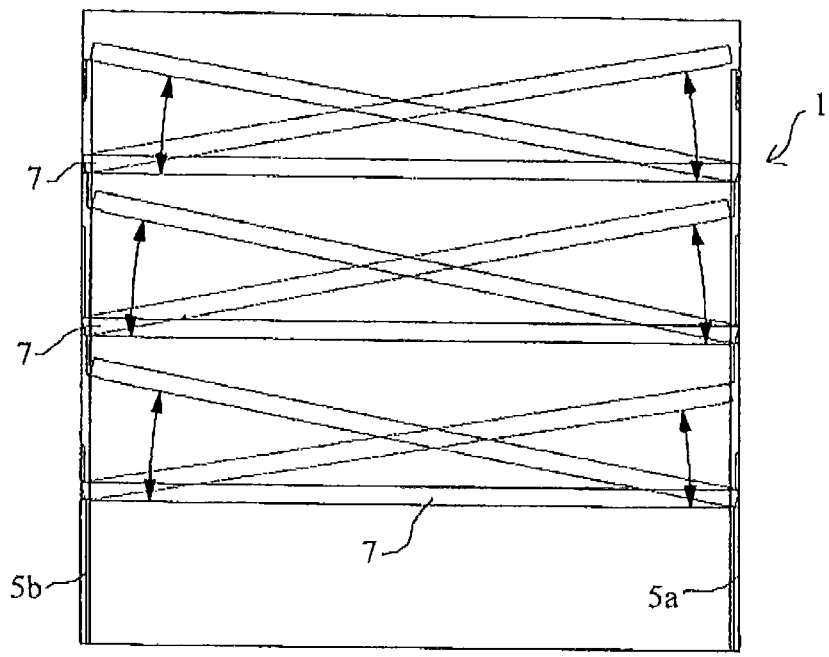
FIG. 14 the embodiment of FIG. 11 with three mounting levels and installed cross bars when assembled in a side view.
Figure 15:
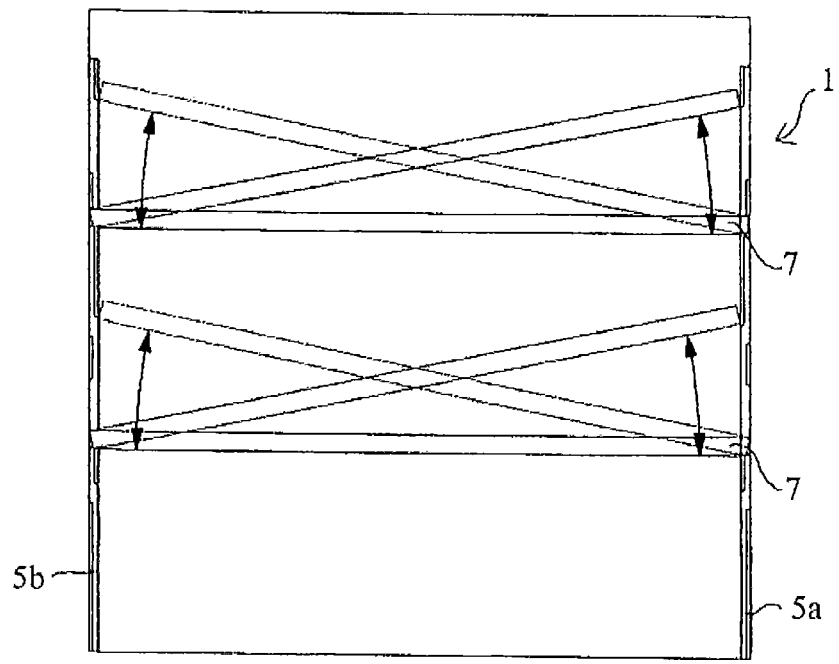
FIG. 15 the embodiment of FIG. 11 with two mounting levels and installed cross bars when assembled in a side view.

FIGS. 14 and 15 each show container storage systems which use the supports of FIG. 11. In FIG. 14, the front side of the support is used for orientation into the container interior, so that cross bars 7 can be or are installed in three levels. In FIG. 15, the respective supports 5a, b are rotated accordingly, so that the variants with two recesses 13 to accommodate two cross bars are used as provided on the rear side of the support 5 in FIG. 11.

Figure 16:
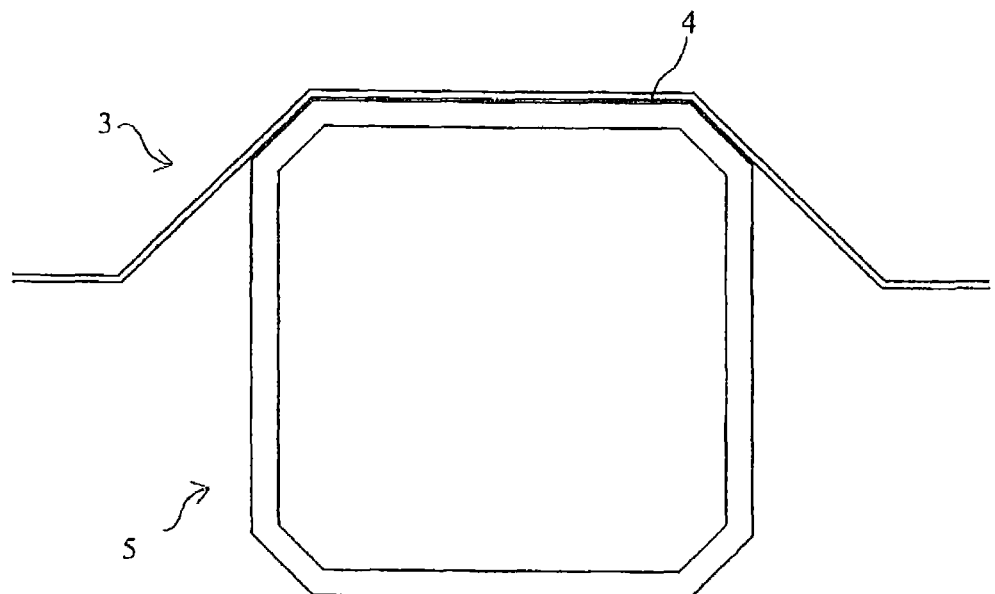
FIG. 16 a top view of another sample embodiment of a support according to the invention.
Figure 17:
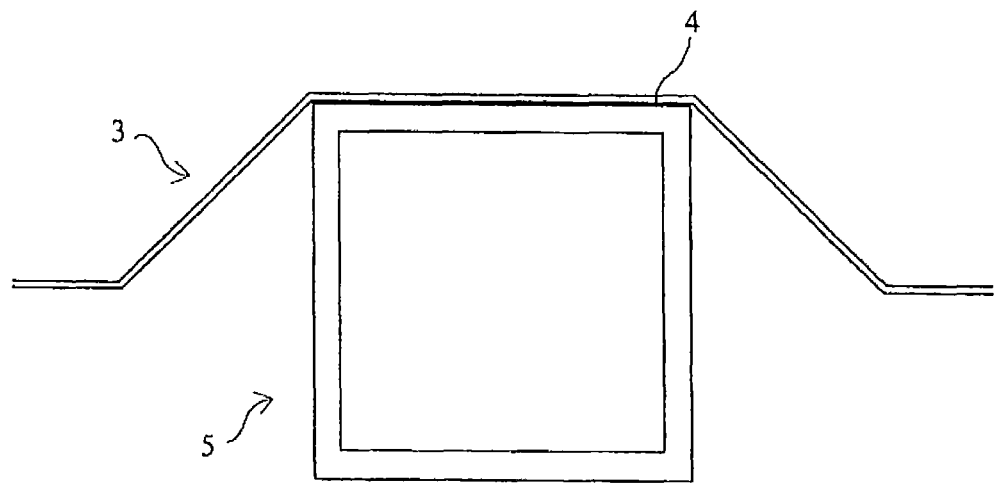
FIG. 17 a top view of another sample embodiment of a support according to the invention.

FIGS. 16 and 17 finally show two additional embodiments of supports 5 according to the invention. These are provided with overall larger support cross section, as in the embodiment of FIGS. 6 to 8, so that a greater load bearing and better distribution of the forces on the support 5 is made possible thanks to increasing the abutment/pressing surface. On the whole, the respective cross bar (not shown) can be broader in design, so that a greater loading is possible. In addition, the supports 5 in FIGS. 16 and 17 are more or less square shaped, so that they project further into the container interior. Each time, it is a single-piece configuration, where the respective recesses and spacing elements and/or bearing elements are milled into the respective support or otherwise made by machining.

The square configuration allows such recesses 13 to be made on each side of the particular support. Depending on the number of recesses formed, the flexibility can thus be further enhanced, since the particular support 5 can be designed to be rotatable and thus afford different stowage possibilities through different numbers of replaceable cross bars. In the variant or embodiment per FIG. 16, the outer edges are additionally beveled, so that the cross section profile can be further enlarged overall.

Further obvious embodiments of the invention will be apparent to the skilled person from the context of the following indicated claims.

LIST OF REFERENCE SYMBOLS

1 Container storage system
3 Container
4 Crease
5a, b Support
7 Cross bar/brace
9a, b Side cheek
11 Bearing element
13 Recess
15 Spacing element 17a, b Ends of cross bar
19a, b Milled groove
21a, b Bearing surface
23a, b Securing spring

The invention claimed is:

1. Container storage system for the transport and/or securing of goods delivered in a container and/or for the subdividing of the container, wherein the container has side walls of trapezoidal sheet with vertical creases, wherein the container storage system comprises:
at least two side supports, which can be arranged vertically in at least two opposite creases of at least two opposite side walls of the container, wherein the supports each have at least one recess which can be oriented toward the inside of the container to accommodate a cross bar and at least one bearing element is provided in the recess to brace the cross bar,
at least one cross bar, which can be installed in the at least two recesses in the at least two supports and which joins together the two supports in the mounted state,
and the container storage system can be assembled and disassembled without the use of tools, characterized in that the at least two supports can be installed in a crease optionally by the front side or the rear side and/or vertically rotated, wherein the front sides and rear sides of the at least two supports have a different number and/or height of the bearing elements along longitudinal axes of the at least two supports.

2. Container storage system according to claim 1, wherein the dimensions of the supports and cross bar are chosen less than the inner dimensions of the container such that the container storage system can be mounted in the container free of stress.

3. Container storage system according to claim 1, wherein the outer contour of the supports is configured at least partly complementary to the creases of the container.

4. Container storage system according to claim 1, wherein the at least one recess in the support is bounded at the bottom by a bearing element for the supporting of a cross bar.

5. Container storage system according to claim 1, wherein the at least two supports are configured as a single piece.

6. Container storage system according to claim 1, wherein the at least two supports are configured as multiple piece.

7. Container storage system according to claim 1, wherein at least one securing element is provided in each support for securing the at least one cross bar.

8. Container storage system according to claim 1, wherein the at least one recess and the at least one bearing element is fashioned or arranged on each side of the particular support.

9. Container storage system according to claim 1, wherein at least one milled groove is provided on either side on at least one cross bar for supporting the bearing element, being dimensioned such that a lateral bearing surface is formed for the defined insertion of the cross bar into the respective recess and on the bearing element.

10. Container storage system according to claim 1, wherein the surface of the at least one cross bar is at least partly antislip treated and/or coated with an antislip material.

11. Container storage system according to claim 1, wherein the dimensioning and outer contour of the at least one cross bar (7) are adapted to the dimensioning and outer contour of the cargo.

12. Container storage system according to claim 1 comprising
at least four side supports each with at least one recess,
at least two cross bars,
wherein the at least two cross bars which can each be inserted in the at least one recess in the at least four supports can be arranged parallel to each other and in the assembled state form at least one additional level for storage of cargo in the container.

13. Container storage system according to claim 12, further comprising a storage element, which can be arranged on both of the at least two cross bars and thus forms an additional storage surface, wherein the storage element can be adapted to the contours and dimensions of the cargo.

14. Container storage system according to claim 1, wherein additional cross bars and/or lengthwise bars can be coupled with the supports and/or cross bars in order to close up stowage and loading gaps.

15. Container storage system according to claim 1, wherein at least two side supports have a length that corresponds entirely to a height of at least one sidewall of the container.

16. Container storage system according to claim 1, wherein a length of the at least one cross bar corresponds almost entirely to an internal cross section dimension of the container.

17. Container storage system for the transport and/or securing of goods delivered in a container and/or for the subdividing of the container, wherein the container has side walls of a trapezoidal sheet with vertical creases,
wherein the container storage system comprises:
at least two side supports, which can be arranged vertically in at least two opposite creases of at least two opposite side walls of the container, wherein the supports each have at least one recess which can be oriented toward the inside of the container to accommodate a cross bar and at least one bearing element is provided in the recess to brace the cross bar,
at least one cross bar, which can be installed in the at least two recesses in the at least two supports and which joins together the two supports in the mounted state, and
wherein the container storage system is in an assembled and free-standing state when the at least two side supports are arranged in the at least two opposite creases and the at least one cross bar is installed in the at least two recesses in the at least two supports.

18. Container storage system for the transport and/or securing of goods delivered in a container and/or for the subdividing of the container, wherein the container has side walls of trapezoidal sheet with vertical creases,
wherein the container storage system comprises:
at least two side supports, which can be arranged vertically in at least two opposite creases of at least two opposite side walls of the container, wherein the supports each have at least one recess which can be oriented toward the inside of the container to accommodate a cross bar and at least one bearing element is provided in the recess to brace the cross bar,
at least one cross bar, which can be installed in the at least two recesses in the at least two supports and which joins together the two supports in the mounted state,
wherein the container storage system is characterized in that the at least two supports are arranged such that a front side or a rear side of each of the at least two supports can be installed in a crease, and
wherein the container storage system is in an assembled state when the at least two side supports are arranged in the at least two opposite creases and the at least one cross bar is installed in the at least two recesses in the at least two supports.

\* \* \* \* \*